United States Patent
Asseh et al.

(10) Patent No.: US 6,510,256 B1
(45) Date of Patent: Jan. 21, 2003

(54) METHOD AND ARRANGEMENT IN CONNECTION WITH OPTICAL BRAGG-REFLECTORS

(75) Inventors: Adel Asseh, Stockholm (SE); Mikael Bergman, Jarfalla (SE); Bengt Sahlgren, Saltsjo-Boo (SE); Simon Sandgren, Stockholm (SE); Raoul Stubbe, Stocksund (SE)

(73) Assignee: Proximion Fiber Optics AB, Kista (SE)

( * ) Notice: Subject to any disclaimer, the term of this patent is extended or adjusted under 35 U.S.C. 154(b) by 156 days.

(21) Appl. No.: 09/606,084

(22) Filed: Jun. 29, 2000

(51) Int. Cl.[7] .................................................. G02F 1/295
(52) U.S. Cl. ................................ 385/10; 385/7; 385/37; 359/573
(58) Field of Search ................................. 385/10, 37, 7

(56) References Cited

U.S. PATENT DOCUMENTS

| | | | |
|---|---|---|---|
| 4,480,476 A | * 11/1984 | Samodovitz | 73/627 |
| 4,725,110 A | 2/1988 | Glenn et al. | 350/361 |
| 5,016,967 A | 5/1991 | Meltz et al. | 350/96.19 |
| 5,042,897 A | 8/1991 | Meltz et al. | 385/37 |
| 5,061,032 A | 10/1991 | Meltz et al. | 385/37 |
| 5,307,437 A | 4/1994 | Facq et al. | 385/124 |
| 5,502,782 A | * 3/1996 | Smith | 385/7 |
| 5,832,156 A | 11/1998 | Strasser et al. | 385/2 |
| 5,850,302 A | 12/1998 | Strasser et al. | 359/127 |
| 5,982,963 A | * 11/1999 | Feng et al. | 385/37 |
| 6,052,179 A | 4/2000 | Prohaska et al. | 356/73.1 |
| 6,072,813 A | * 6/2000 | Tournois | 372/25 |
| 6,169,830 B1 | * 1/2001 | Kewitsch et al. | 385/37 |

OTHER PUBLICATIONS

Xiang–fei Chen et al., "Superchirped moiré grating based on an acousto–optic superlattice with a chirped fiber Bragg grating", Nov. 15, 1999, Optic Letters, vol. 24, No. 22, pp. 1558–60.

* cited by examiner

*Primary Examiner*—Cassandra Spyrou
*Assistant Examiner*—Arnel C. Lavarias
(74) *Attorney, Agent, or Firm*—Birch, Stewart, Kolasch & Birch, LLP (57) ABSTRACT

A method of establishing transmission of light through a chirped Bragg-reflector, a method of analyzing the power spectrum of a light signal using a chirped Bragg-reflector, and an arrangement for analyzing the power spectrum of a light signal. The Bragg-reflector reflects, in an unperturbed state, essentially all incident light within a predefined wavelength range. The methods include the steps of directing the light to be analyzed into an input end of a light guiding structure, such as an optical fiber, which light guiding structure is provided with a Bragg-reflector, and sending an acoustic pulse along the light guiding structure, thereby effectively lowering the reflectance of the Bragg-reflector for a certain wavelength at a certain time. By monitoring the light thus transmitted through the Bragg-reflector, a power spectrum analysis of the incident light is obtained.

29 Claims, 10 Drawing Sheets

METHOD AND ARRANGEMENT IN CONNECTION WITH OPTICAL BRAGG-REFLECTORS

TECHNICAL FIELD OF THE INVENTION

The present invention relates to optical Bragg-reflectors, and more particularly to the alteration of the reflective properties of optical Bragg-reflectors.

BACKGROUND OF THE INVENTION

The need for capacity in communications networks is increasing exponentially, and presently capacity demands are doubling every eighteen months or even less. Efforts are being made in the telecom and computer business to meet this incredible expansion of bandwidth requirements.

One obvious action is to simply draw new optical cables between nodes of the network. However, this approach is costly and hardly a successful way of meeting the upcoming demands. Instead, measures are focused, when possible, on augmenting the capacity of existing fiber networks.

One widespread method of achieving increased transfer capacity in existing fiber networks is wavelength division multiplexing (WDM). In WDM, a single optical fiber is used for the transmission of several channels of information, each channel being associated with a specific wavelength. For a background of this technology, the reader is directed to, "A review of WDM technology and applications", *Opt. Fiber Technol.*, 5, pp. 3–39 (1999).

While the use of WDM in optical networks yields a substantial increase in transfer capacity, the complexity of the communications systems increases correspondingly. Furthermore, the number of physical components in each link of the network increases, the requirements on each component increase, and detecting and localizing errors or imperfections in the network is rendered more difficult.

The optical networks of today mainly use point-to-point communication, wherein electronically encoded information in one node of the network is transformed into optically encoded information, and then transferred, through a sequence of optical fiber amplifiers and optical transport fibers, to another node, where the optically encoded information is transformed back into electrically encoded information.

However, this prior art is associated with major drawbacks and limitations.

If, for instance, an error occurs in one of the fiber amplifiers, it is very hard to determine which amplifier, in the sequence of amplifiers, is the faulty one.

Furthermore, technology is being pushed towards communications systems in which the optical signal is passed via all-optical switching nodes, where the signal is routed without any need for optical-to-electrical conversion or vice versa. Thus, if an error is detected in a receiving node of the communications network, it is extremely hard to localize the origin of error.

If the light signal propagating in an optical transport fiber could be analyzed in an accurate and simple fashion, without interfering with the signal, any flaws in the optical communications network could be detected at an early stage. In the prior art, such analysis has been too complicated, too expensive and too inaccurate to gain widespread acceptance.

Obviously, it is of utmost importance to be able to monitor the power spectrum of the light propagating in the optical transport fiber.

It is known in the prior art to use a phase grating in an optical fiber in order to filter out one desired wavelength from a broadband light signal. A phase grating will reflect one predefined wavelength and leave other wavelengths essentially undisturbed.

An optical phase grating is a structure of essentially periodically varying refractive index in an optically transparent medium. An overview of the technology is given in M. C. Hutley, "Diffraction gratings", Academic Press, London (1982). When light is incident on an optical phase grating, a small part of the incident light is reflected off each grating element (period). When a multiplicity of grating elements are arranged after each other (i.e., arranged as a phase grating), the total reflected light would be the sum of all these single reflections. The fraction of the incident light reflected off each grating element is determined by the depth (amplitude) of the refractive index modulation in the phase grating. The deeper the modulation, the larger fraction of the incident light is reflected off each grating element. If the incident light is essentially normal to the grating (i.e., to the grating elements), the grating is said to act in the Bragg domain and is named "Bragg grating". Light reflected off each grating element will thus overlap the light reflected off the other elements, causing interference. For a certain wavelength, all these reflections are in phase, whereby constructive interference is effected. Although each reflection is small, a substantial reflection is obtained due to constructive interference. The wavelength for which constructive interference is effected is called the "Bragg wavelength," $\lambda_{Bragg}$, and is given by (at normal angle of incidence)

$$\lambda_{bragg} = 2n\Lambda$$

where n is the average of the refractive index, and $\Lambda$ is the grating period.

If the grating period, $\Lambda$, varies along the grating, the grating is said to be a "chirped" Bragg grating. In a chirped Bragg grating, different wavelengths are reflected in different portions of the grating, in fact, making the Bragg grating a broadband reflector, a chirped Bragg-reflector.

U.S. Pat. No. 6,052,179 discloses a system for determining the average wavelength of light transmitted through an optical fiber. In this system, a chirped Bragg grating is provided in an optical fiber, the grating having a modulation amplitude that varies from a first end to a second end of the fiber grating. Thus, the reflectivity at one wavelength is different from the reflectivity at another wavelength, since different wavelengths are reflected at different portions of the grating. Based on the output from two photo detectors, one detecting the light transmitted through the grating and the other acting as a reference, the average wavelength of light transmitted through the grating is determined. However, this approach has several disadvantages. Firstly, the light to be analyzed has to be divided into two separate fibers, which is a serious complication in itself. Secondly, only the average wavelength can be determined. There is no possibility for proper spectrum analysis by the system disclosed in the above reference. Furthermore, the system is intended for sensing applications, where external influence changes the average wavelength coming into the system.

Previous attempts to alter the reflective properties of an optical Bragg grating include creation of an acousto-optic superlattice imposed on a chirped Bragg grating. Such an arrangement is described by Chen et al. in "Superchirped moirégrating based on an acousto-optic superlattice with a chirped fiber Bragg grating", *Optics Letters*, Vol. 24, No. 22, pp. 1558–1560. According to this reference, multiple transmission peaks are obtained by superimposing an acoustic wave on a chirped Bragg grating. The spacing of the transmission peaks is varied by the acoustic frequency. However, this arrangement does not permit transmission of one single wavelength only, and the variation of the spacing of the transmission peaks by acoustic frequency is very limited.

SUMMARY OF THE INVENTION

The present invention provides new methods and arrangements for establishing transmission of light through a reflecting Bragg grating, and for utilizing such transmission for analysis of the characteristics of a light signal. The drawbacks and limitations associated with the prior art are effectively eliminated by a method and an arrangement of the general kind set forth in the accompanying claims.

The present invention has further advantages, which will be apparent from the detailed description set forth below.

It is a general object of the present invention to provide a method of establishing transmission of light through a broadband, chirped Bragg-reflector. The method can be used for analysis of the power spectrum of a light signal, as well as for other applications where it is desirable to transmit a certain wavelength component of light through a structure at a certain instant in time.

Furthermore, it is an object of the present invention to provide a method and an arrangement for spectrum analysis of a light signal, which method and arrangement essentially eliminate the aforementioned drawbacks and limitations of the prior art. Briefly stated, this is obtained by establishing transmission of light through a chirped Bragg-reflector by means of a longitudinal acoustic pulse being present in the grating structure. The presence of the acoustic pulse alters the reflective properties of the Bragg-reflector, thus giving rise to transmission of a specific wavelength of light for each position of the acoustic pulse in the Bragg-reflector.

According to a first aspect of the present invention, a method of establishing transmission of light through a chirped Bragg-reflector is provided, by which method a certain wavelength component is transmitted through the Bragg-reflector at a certain (corresponding) instant in time. In an unperturbed state, the Bragg-reflector is reflecting essentially all incident light within a predefined wavelength range. According to the invention, light is incident into an optical waveguide incorporating a chirped Bragg-reflector. The reflective properties of said Bragg-reflector are altered by sending a longitudinal acoustic pulse into said waveguide for propagation along the same. For each location of said acoustic pulse in the chirped Bragg-reflector, the reflectivity for a wavelength associated with said location in said Bragg-reflector is altered, thereby establishing transmission of the wavelength at issue.

According to a second aspect of the present invention, a new method of analyzing the power spectrum of a light signal is provided. The method of analyzing the power spectrum is based on the aforementioned method of establishing transmission of light through a chirped Bragg-reflector. Briefly stated, analysis of the power spectrum is obtained by monitoring the light transmitted through the Bragg-reflector, and by subsequent analysis of the monitored signal.

One advantage of this method is that it is sufficient to tap off only a small part (typically about 1% or less) of the light propagating in an optical transport fiber into a secondary fiber. The light in the secondary fiber is then analyzed, and the interfering effect on the transport fiber is negligible. The light is tapped off from the transport fiber by non-wavelength discriminating coupling means, as known in the art. By analyzing the light in the secondary fiber by the method according to the present invention, the power spectrum of the light signal propagating in said transport fiber is determined with very high accuracy. Furthermore, the light signal in the transport fiber is essentially undisturbed, apart from the 1% tapped off.

Another advantage of the present invention is that it also allows for real time supervision of a fiber-based communications system. The information obtained from such supervision can advantageously be utilized for controlling other equipment connected to said system, such as amplifiers, filters, etc. In-line amplifiers and filters can be controlled in a feedback configuration with a spectrum analyzer according to the present invention.

Yet another advantage of the present invention is that a wavelength scan of transmitted light is obtained, which is very convenient for spectrum analysis. The present invention can provide for repeated wavelength scans, thereby facilitating interpretation and analysis of the monitored signal.

According to a third aspect of the present invention, an arrangement is provided for measuring and characterizing the power spectrum of a light signal propagating in an optical fiber. Such an arrangement includes a chirped Bragg-reflector operating in accordance with the methods above.

The present invention is based on the general insight that the reflective properties of a chirped Bragg grating (or chirped Bragg-reflector) can be altered by a longitudinal acoustic pulse propagating along the grating. More particularly, the present invention is further based on the deeper insight that a longitudinal acoustic pulse of carefully chosen shape propagating along the grating can give highly accurate, and wavelength separated in time, transmission through the chirped Bragg grating.

According to one embodiment of the present invention, a method of establishing transmission of light through a chirped Bragg-reflector includes the steps of directing light into a light guiding structure provided with said Bragg-reflector, and sending a longitudinal acoustic pulse along said light guiding structure, thereby locally and temporarily altering the reflective properties of the Bragg-reflector for a certain wavelength corresponding to the momentary position of the travelling acoustic pulse.

According to another embodiment of the present invention, an optical fiber is provided with a chirped Bragg grating. The fiber has an input end and an output end, for the input of a light signal into said fiber and for the output of a transmitted part of said light signal, respectively. Connected to the optical fiber is an acoustic actuator for the emission of a longitudinal acoustic pulse into said fiber. The acoustic pulse is given a shape that has the effect of lowering the reflectance of the chirped Bragg-reflector for a certain wavelength at a certain instant in time. Preferably, the acoustic pulse is given an anti-symmetric shape, whereby an etalon effect is achieved in the proximity of the travelling acoustic pulse, thereby locally lowering the reflectivity of the chirped Bragg-reflector to essentially zero.

BRIEF DESCRIPTION OF THE DRAWINGS

The following detailed description of preferred embodiments is better understood when read in conjunction with the accompanying schematic drawings, in which.

DETAILED DESCRIPTION OF PREFERRED EMBODIMENTS

Typically, and in accordance with one embodiment of the present invention, a chirped Bragg-reflector is provided in an optical fiber. As described above, the chirped Bragg-reflector is a distributed structure that reflects light within a predefined wavelength range. The wavelength reflected in each portion of the distributed structure depends on the local period of the grating constituting the Bragg-reflector. The grating period is defined as the distance between two adjacent grating elements. The shorter the grating period, the shorter the wavelength that is reflected.

In a chirped grating, the grating period varies along the grating, usually in a steady fashion (e.g., from a short period to a longer period, or from a long period to a shorter period). The period can vary continuously or stepwise. In a portion of the grating (i.e., the chirped Bragg-reflector) where the grating period is short, a short wavelength is reflected, and in a portion of the grating where the grating period is long, a long wavelength is reflected. In effect, different wavelengths are reflected in different portions of the chirped Bragg-reflector.

Compression and/or elongation of the fiber can alter the reflective properties of the chirped Bragg-reflector. According to the present invention, this is accomplished by means of a longitudinal acoustic pulse which causes temporary compression and/or elongation of the fiber as it propagates along the fiber. In fact, such compression or elongation introduces both refractive index changes and actual path changes, the latter, however, being predominant. The aggregate effect on light is a combination of the change in refractive index and the change of the actual period of the grating in the fiber. From a phenomenological point of view, the crucial quantity is the optical path traversed by the light in the fiber. The optical path is defined as the actual, physical path multiplied by the refractive index of the medium in which the light is propagating. For example, an increase of the effective grating period in a Bragg grating in an optical fiber could be obtained either by increasing the refractive index of the fiber, or by increasing the physical length of the period (i.e., the fiber).

When stretching or compressing an optical fiber provided with a Bragg-reflector, the change in refractive index is negligible compared to the actual change in physical path. Therefore, if any portion of a chirped Bragg-reflector is stretched, this portion will reflect a longer wavelength than it would do in its unperturbed state. This actually applies for any Bragg-reflector, even with a constant grating period.

The basic principle behind the present invention will now be described in greater detail with reference to FIG. 1.

An optical fiber 10 incorporates, in the core 102 thereof, a chirped Bragg grating 104. The Bragg grating is incorporated into the optical fiber by means of methods known in the art. The fiber 10 has an input end 11 and an output end 12, for receiving input of a light signal and for delivering an output signal, respectively. The chirped Bragg grating exhibits a modulation that is strong enough to reflect essentially all incident light within a predefined wavelength range when the grating is in an unperturbed state. Due to this fact, the chirped Bragg grating is referred to as a chirped "Bragg-reflector." In this case, it is assumed that the Bragg-reflector reflects all light wavelengths between $\lambda_0$ and $\lambda_k$. Any wavelength of light within this range will be reflected if sent into the optical fiber incorporating said Bragg-reflector.

In order to establish transmission of light within this wavelength range ($\lambda_0$ to $\lambda_k$) through the chirped Bragg-reflector, a light signal is first directed into the input end 11 of the optical fiber 10, as is indicated by the arrow 111. If the optical fiber, and thus the chirped Bragg-reflector, is in an unperturbed state, the light will be reflected back towards the input end 11, and no light will be transmitted to the output end 12. A longitudinal acoustic pulse 120 is then sent along the optical fiber. In this case, and as shown in the figure, the longitudinal acoustic pulse 120 has an anti-symmetric shape, thereby causing in one part a localized and temporary elongation of the optical fiber 10 and, in another part, a localized and temporary compression of the optical fiber 10. The acoustic pulse 120 alters the reflective properties of the chirped Bragg-reflector 104, and effectively establishes transmission of light through the optical fiber 10.

Figure 1:
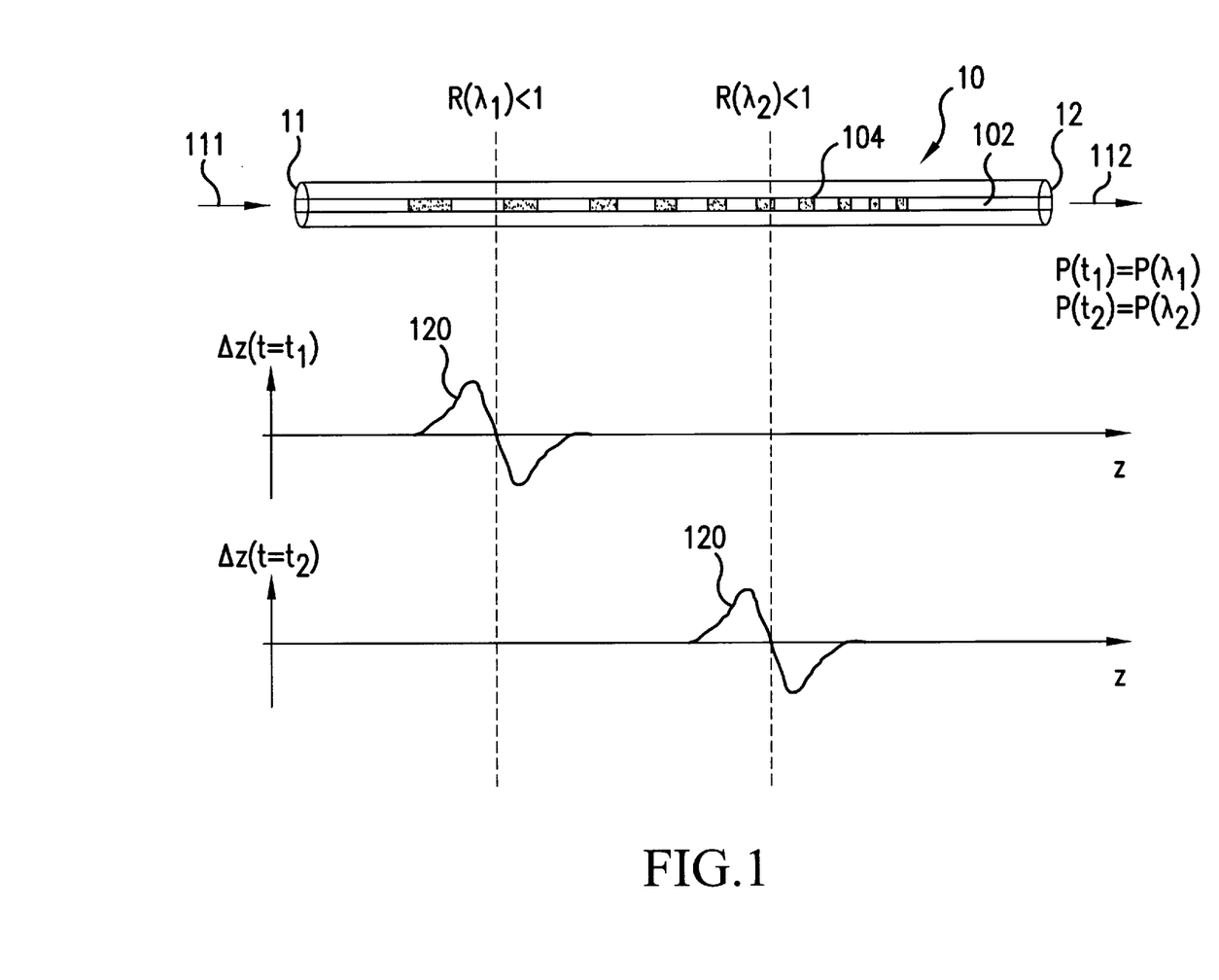
FIG. 1 is a schematic outline of the basic principle behind the present invention.

In FIG. 1, the chirped Bragg-reflector is shown to have a grating period that decreases from left to right. This means, as described above, that a longer wavelength is reflected in the left portion of the Bragg-reflector than in the right portion of the Bragg-reflector. When the longitudinal acoustic pulse travels along the grating from left to right, and hence locally and temporarily alters the reflective properties of the reflector, longer wavelengths will be transmitted first, followed by shorter wavelengths.

The mechanism behind the alteration of the reflective properties of the chirped Bragg-reflector will now be described in more detail.

The acoustic pulse that is sent along the optical fiber has one elongating part causing a temporary elongation of the optical fiber, and one compressing part causing a temporary compression of the optical fiber, as mentioned above. In the present example, the acoustic pulse is essentially anti-symmetric, each of said parts being equally important. When the acoustic pulse is sent along the chirped Bragg-reflector (the optical fiber) in a direction in which the grating exhibits a decreasing grating period, it is essential that the acoustic pulse has a leading portion that causes a decrease of the grating period (i.e., a portion that causes a compression of the optical fiber) and a trailing portion that causes an increase of the grating period (i.e., a portion that causes an elongation of the optical fiber). The leading portion of the acoustic pulse will then temporarily alter the local grating period such that the altered local grating period actually gives a reflection for a somewhat shorter wavelength than in its unperturbed state. The trailing portion of the acoustic pulse will, at the same time, temporarily alter the local grating period such that the altered local grating period actually gives a reflection for a somewhat longer wavelength than in its unperturbed state. Effectively, a window is created where there is reduced or no reflection, since the grating period of the chirped Bragg-reflector is altered in such a way that there is no grating period giving reflection for a certain wavelength. As the longitudinal acoustic pulse propagates along the chirped Bragg-reflector reflector, the above situation will successively apply for shorter wavelengths, thereby creating a wavelength scan of transmitted light.

If the acoustic pulse propagates along the chirped Bragg-reflector in a direction with increasing grating period, the acoustic pulse should, of course, have the opposite phase in order to cause a similar effect as before.

When the acoustic pulse is given an anti-symmetric shape with a sufficiently short rise time (or fall time) between the compressive and the elongating portion, an etalon effect is obtained, where the reflectivity for a certain wavelength drops essentially to zero.

In the lower part of FIG. 1, the acoustic pulse is shown in a coordinate system at two different instants. The compression/elongation is illustrated as a change in longitudinal dimension $\Delta z$ at a first point in time $t_1$ and a second point in time $t_2$. At time $t_1$, the acoustic pulse is in a first portion of the Bragg-reflector where the unperturbed grating period is large, hence causing transmission of a long wavelength $\lambda_1$ through the optical fiber. At a later time $t_2$, the acoustic pulse has propagated to a second portion of the Bragg-reflector where the unperturbed grating period is shorter than in the first portion, hence causing transmission of a shorter wavelength $\lambda_2$ through the optical fiber. Consequently, the output power at the output end 12 of the optical fiber at a certain point in time is associated with the power of a corresponding wavelength. In this example, the output power at time $t_1$, which is denoted $P(t_1)$, is associated with the power of the incident light at wavelength $\lambda_1$, which is denoted $P(\lambda_1)$ Thus, $P(t_1)=P(\lambda_1)$, $P(t_2)=P(\lambda_2)$, etc., any losses neglected.

In some cases, small leakage through the unperturbed Bragg-reflector can be allowed, since compensating for such leakage would be straightforward.

Figure 2:
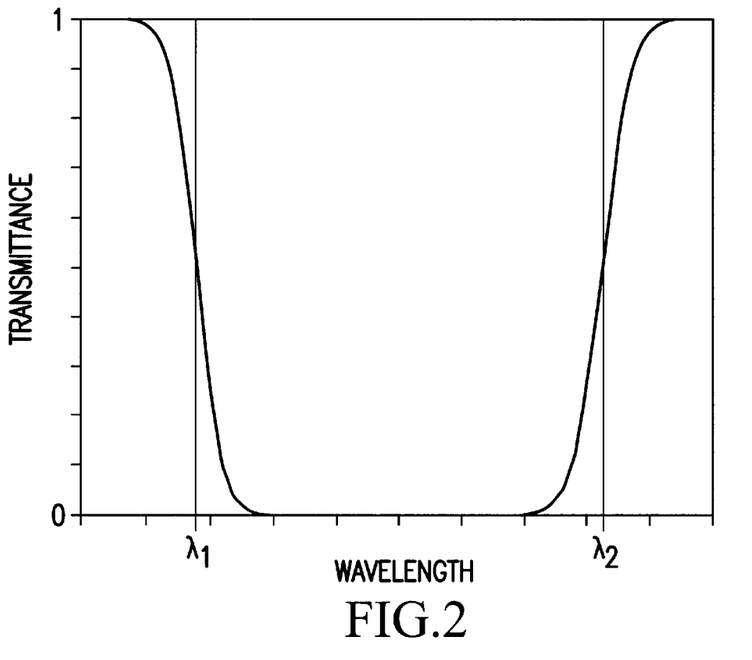
FIG. 2 shows a typical transmittance profile of a chirped Bragg-reflector in an unperturbed state.

FIG. 2 shows schematically the transmittance of the Bragg-reflector as a function of wavelength. Illustrated in the figure is a reflection band, where there is essentially no transmission. The full width at half maximum (FWHM) of this reflection band is, in the exemplary embodiment, 40 nm. Typically, some 30 nm of the reflection band exhibits no transmission at all in the unperturbed state of the Bragg-reflector, i.e., practically 100 percent reflection. However, almost any width of the reflection band could conceivably be obtained by choosing the grating period and the chirp accordingly.

Figure 3:
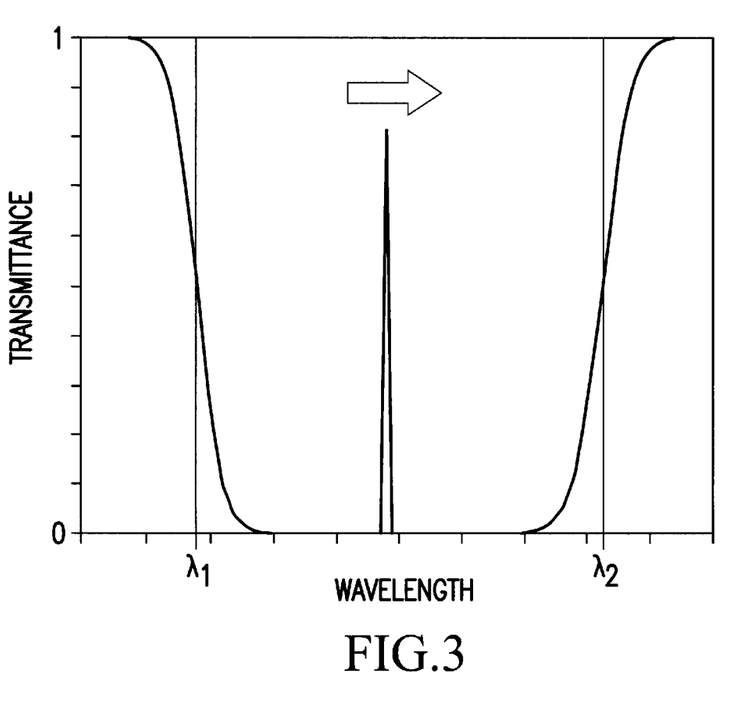
FIG. 3 illustrates a transmittance peak caused by the presence of an acoustic pulse in the chirped Bragg-reflector that sweeps through the reflectance band of the Bragg-reflector.

FIG. 3 illustrates a narrow transmittance peak that sweeps through the reflection band as the acoustic pulse propagates along the Bragg-reflector. In the figure, the transmittance peak is shown to sweep from longer wavelengths to shorter (from left to right in the figure, as indicated by the arrow), which is the case when the acoustic pulse propagates through the chirped Bragg-reflector in a direction from a longer grating period to a shorter grating period. Of course, if the acoustic pulse was propagating in the opposite direction through the chirped Bragg-reflector, the transmittance peak would sweep in the opposite direction, i.e., from a shorter wavelength to a longer wavelength. When the transmittance peak sweeps through the reflection band of the chirped Bragg-reflector, a wavelength scan of transmitted wavelengths is effectively achieved.

Figure 4:
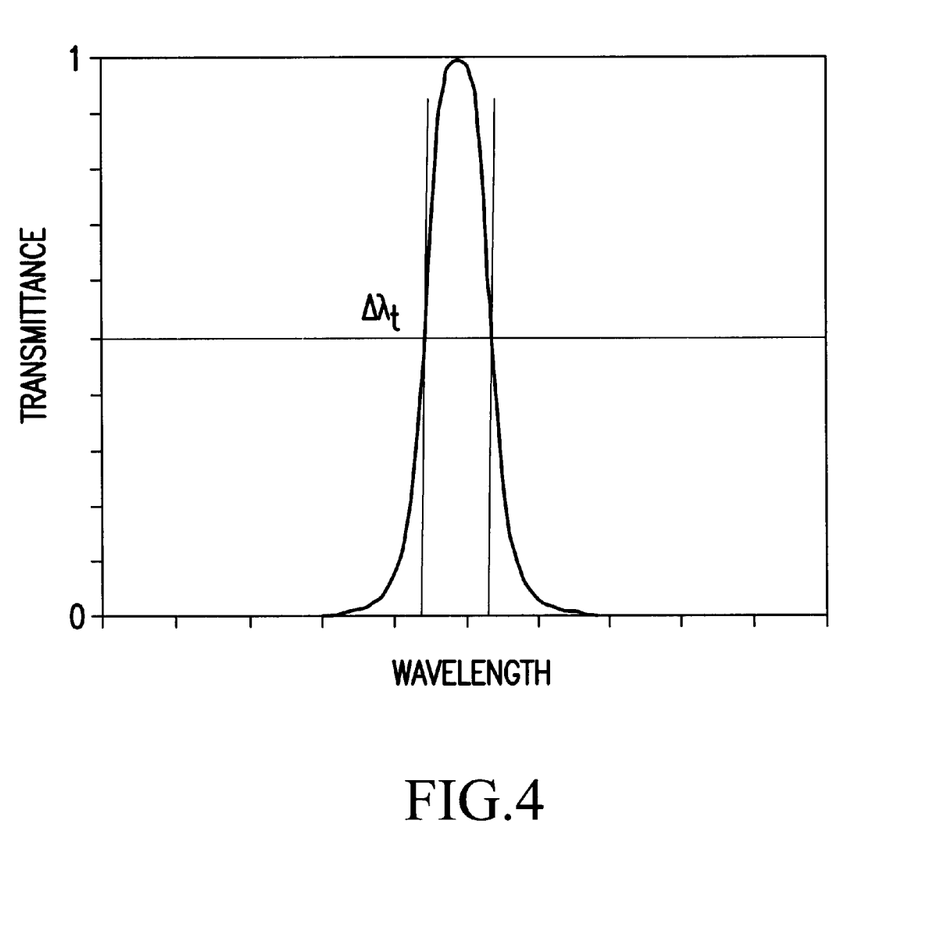
FIG. 4 is an enlarged view of the transmittance peak caused by the presence of an acoustic pulse in the Bragg-reflector.

FIG. 4 is an enlarged illustration of the transmittance peak. The width of the transmittance peak can be chosen by proper selection of chirp of the Bragg-reflector (i.e., the rate of change of the grating period) and the modulation depth of the grating. The transmittance peak could be as narrow as 40 pm. However, when the present invention is utilized in a spectrum analyzer in a WDM system, a transmittance peak of about 0.1 nm (FWHM) is sufficient in order to separate the different channels. As indicated in FIG. 4, the transmittance peak can reach 100 percent by choosing the proper system parameters.

Figure 5:
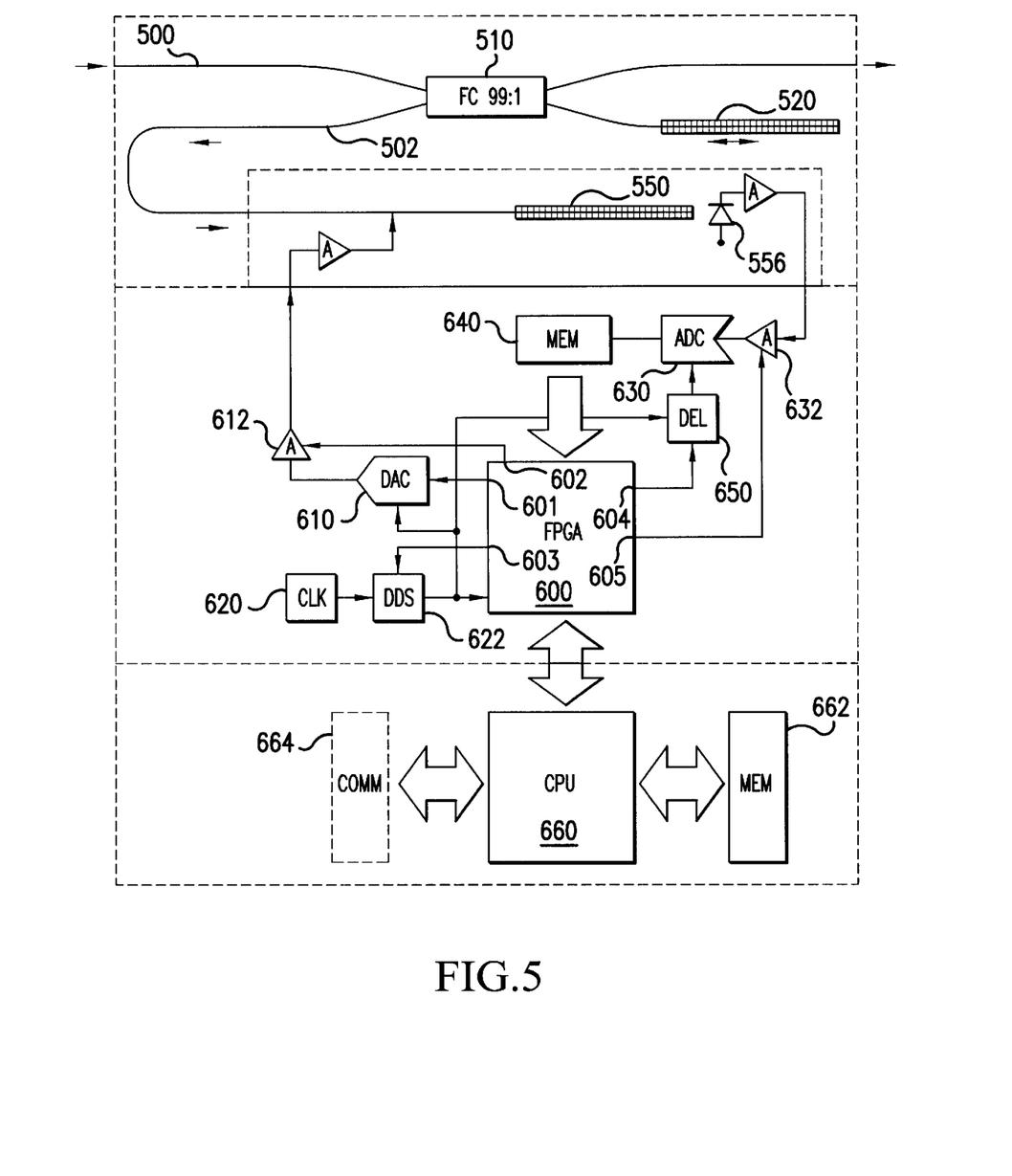
FIG. 5 shows an overview of an arrangement for spectrum analysis according to the present invention.

FIG. 5 shows a schematic overview of a preferred embodiment of an arrangement for analyzing the power spectrum of a light signal according to the present invention.

The arrangement is utilized for analysis of the power spectrum of a light signal propagating in an optical transport fiber. A small fraction (typically about 1 percent) of the light propagating in the optical transport fiber is tapped of by a fiber coupler. The light tapped off is subsequently directed into a fiber provided with a chirped Bragg-reflector. Transmission of light through the chirped Bragg-reflector is achieved in accordance with the inventive method described above by means of sending an acoustic pulse along the fiber. The light thus transmitted is monitored and analyzed in order to provide spectrum analysis of the light signal directed into the fiber.

The preferred arrangement according to the present invention will now be described in greater detail with reference to FIG. 5.

The arrangement is operatively connected to an optical transport fiber 500 through a fiber coupler 510. The coupler 510 is a tap coupler tapping off 1 percent of the power of the light propagating in the optical transport fiber 500. The coupler 510 is non-discriminating in terms of wavelength, which means that each wavelength component propagating in the fiber 500 is tapped off with the same coupling factor. Effectively, the power spectrum of the 1 percent tapped off has the same profile as the power spectrum of the original light signal propagating in the transport fiber 500, but at a lower peak power.

The light tapped off the transport fiber 500 is directed into a secondary fiber 502 and, incident upon a broadband Bragg-reflector 520, incorporated into the fiber 502, which Bragg-reflector operates as a broadband filter for incident light. Only light within the reflectance band of the filtering reflector 520 is reflected back into the secondary fiber 502, the broadband Bragg-reflector 520 thus pre-filtering the light signal to be analyzed. Typically, this pre-filtering of the light by means of the filtering reflector 520 selects (i.e., filters out by reflection) the signals in the C- or L-band of the telecommunications bands. The reflected light is subsequently directed into a portion of the secondary fiber incorporating a second Bragg-reflector 550. The second Bragg-reflector 550 is a chirped Bragg-reflector reflecting essentially the same wavelength band as the filtering reflector 520.

The second Bragg-reflector 550 is utilized for establishing transmission of light towards a photodetector 556 provided at the output end of the secondary fiber 502. The transmission of light towards the photodetector 556 is obtained by sending a longitudinal acoustic pulse along the portion of the secondary fiber 502 incorporating the chirped Bragg-reflector 550 according to the present invention. By sending a longitudinal acoustic pulse along the chirped Bragg-grating 550, transmission through the secondary optical fiber 502 is achieved in a very precise fashion. The mechanism behind the transmission is described in detail above.

The arrangement for analyzing the power spectrum, according to the present invention, includes an acoustic actuator (not shown in FIG. 5) for sending longitudinal acoustic pulses along the chirped Bragg-reflector 550 in the secondary optical fiber 502; a photodetector 556 for detecting the power of the light transmitted through the Bragg-reflector 550; programmable logic 600, in the form of an FPGA (Field Programmable Gate Array), for storing the waveform of the actuating pulses, and for controlling other hardware and performing simple signal analysis; a digital to analog converter 610 (DAC) for converting digitally encoded output from the FPGA 600 into analog form; an analog to digital converter 630 (ADC) for converting monitored analog signals into digital form for further storing and processing; a memory 640 (Mem) for storing measurement data; a delay line 650 (Del) for sub-sampling data in order to improve measurement resolution; a clock circuit 620 (Clk) for supplying clock pulses to the logic 600; a digital synthesizer circuit 622 (DDS) for tuning the clock frequency and thereby tuning the repetition rate of actuating pulses to the acoustic actuator; and a processing unit 660 (CPU) for processing data and for communicating with the logic 600 and other peripherals.

The longitudinal acoustic pulse to be sent along the chirped Bragg-reflector 550 is excited by the acoustic actuator (not shown in FIG. 5, but shown in great detail in FIGS. 6–9) attached to the secondary fiber 502. The supply of actuating pulses to the acoustic actuator is controlled by the programmable logic 600 (FPGA) . In the FPGA 600, the waveform of the actuating pulses is stored in digital form. A first output 601 of the FPGA 600 is connected to a first input of a digital to analog converter 610 (DAC). The DAC is operative to convert the digitally encoded waveform of the actuating pulses to an analog waveform and to send the analog output signal to an amplifier 612. The amplified output of the amplifier 612 is fed to the acoustic actuator as actuating pulses. A second output 602 of the FPGA 600 is connected to the amplifier 612 in order to provide control signals from the FPGA 600 to the amplifier 612.

The FPGA 600 is triggered by clock pulses from a clock circuit 620 (Clk). The output of the clock circuit 620 is operatively connected to the FPGA 600 via the digital synthesizer circuit 622 (DDS). The digital synthesizer circuit 622 is operative to tune the frequency of the clock circuit 620 in order to obtain tuning capability of the actuating pulses to the acoustic actuator. In order to control the DDS 622, a third output 603 of the FPGA 600 is connected to the DDS. The clock circuit 620 is also operatively connected, via said DDS, to the DAC 610 and to the delay line 650 and the ADC 630.

The photodetector 556 is operative to detect the power of the output signal from the secondary fiber 502, after transmission through the chirped Bragg-reflector 550. As described above, the output power at each instant corresponds to the power of a certain wavelength component in the light signal directed into the secondary fiber 502. The light directed into the secondary fiber, in turn, corresponds on a one-to-one basis to the light propagating in the optical transport fiber 500. The photodetector 556 is arranged to provide a detector output signal, associated with the power of the detected signal, to a preamplifier 632. The output signal from the preamplifier 632 is passed to the ADC 630. The ADC 630 is operative to convert the amplified detector output signal into digitally encoded form and to provide the digitally encoded measurement data to the memory 640 for storing. The delay line 650 and the amplifier 632 (and thus the ADC 630) are controlled by the FPGA 600 through fourth 604 and fifth 605 outputs of the FPGA, respectively.

The contents of the memory 640 is readable to the programmable logic 600. The programmable logic 600 is arranged to read the stored measurement data from the memory 640 and to perform simple signal analysis of the stored data. The analysis performed by the programmable logic 600 is the basis for the control that the logic 600 exerts on the DDS 622, the delay line 650, as well as for the actuating pulses fed to the DAC 610. Furthermore, the programmable logic 600 can communicate with a processing unit 660 (CPU) in order to transfer measurement data for further processing and supervision of system performance.

The processing unit 660 has a memory 662 for storing both processed and non-processed data. Also, the processing unit has connections 664 for communicating with other peripherals (not shown), such as a display device, a keyboard, an I/O-device for communicating with other apparatus, etc.

Furthermore, the output of the filtering reflector 520 can advantageously be connected to a second arrangement according to the present invention. For example, if the C-band of the communications bands is filtered out by a first filtering reflector and analyzed in a first arrangement according to the present invention, then a second arrangement can be coupled to the first for analyzing the power spectrum of light signals in the L-band of the communications bands. A person having ordinary skill in the art will find it straightforward to combine two arrangements according to the present invention, in order to analyze two different communications bands simultaneously.

The acoustic actuator and the supply of longitudinal acoustic pulses to the portion of the secondary optical fiber 502 incorporating the chirped Bragg-reflector 550 will now be described in more detail with reference to FIGS. 6–9.

Figure 6:
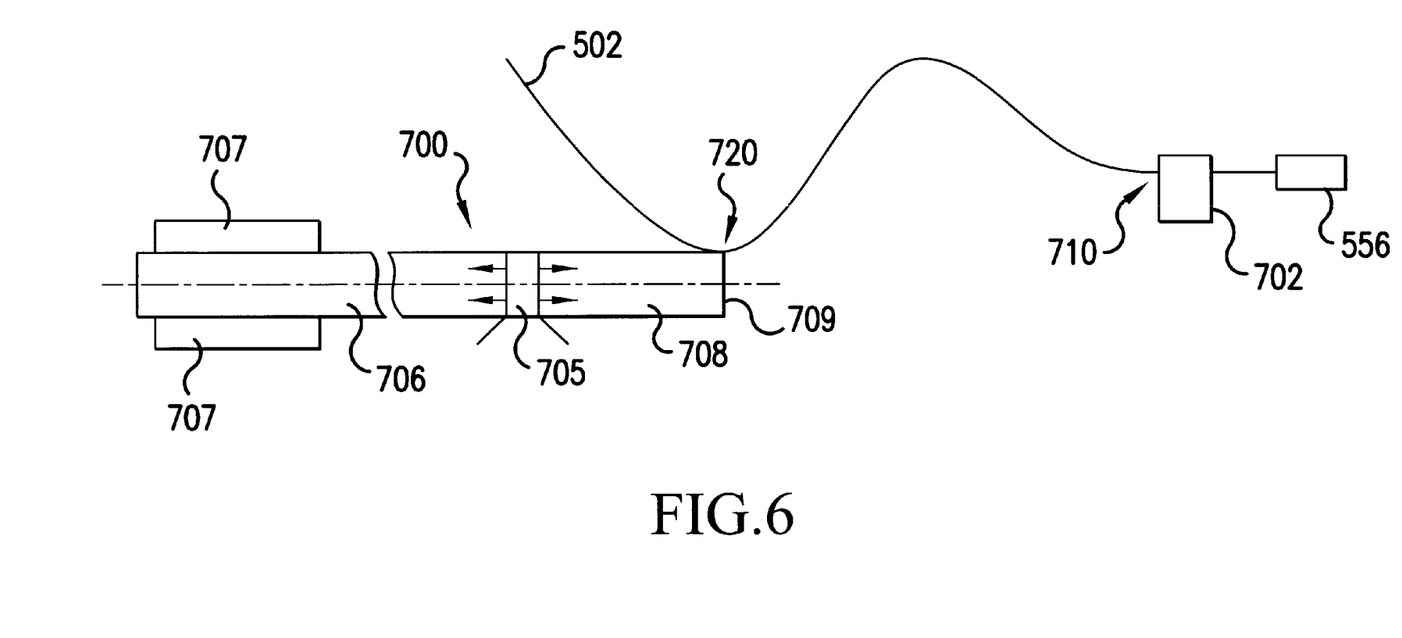
FIG. 6 shows the acoustic actuator and the fiber arrangement according to the present invention.

FIG. 6 shows schematically an acoustic actuator module 700 and the secondary fiber 502 attached thereto.

The acoustic actuator comprises a piezo device 705, made from a piezo-electric material, arranged in a rod 706, 708 capable of guiding acoustic pulses along its longitudinal axis. The rod is made from aluminium, but could also be made from, for example, copper or other suitable material. The piezo device 705 has two connectors attached to its surface for the supply of actuating pulses thereto. The piezo device is responsive to actuating pulses by changing its longitudinal size. Hence, when a voltage is applied to the piezo device 705, the size of the device changes accordingly. If properly actuated, the acoustic actuator emits an acoustic pulse into the rod 706, 708 (as indicated in the figure by the four solid arrows), the rod guiding said pulse towards its ends. One end 706 of the rod is provided with an acoustic attenuator 707, effectively damping the acoustic pulse to essentially zero amplitude. The other end 708 of the rod is firmly attached to the fiber 502, thereby ensuring that the acoustic pulse, emitted by the acoustic actuator, is transferred to the fiber 502. When the acoustic pulse reaches the fiber end 709 of the rod 708, some of the acoustic power is reflected back towards the piezo device 705, and some of the acoustic power is transferred to the fiber 502. The part of the acoustic power that is reflected back into the rod passes through the piezo device 705 and is effectively damped by the acoustic attenuator 707. This ensures that only one pulse is sent into the fiber 502 by each actuation of the piezo device 705.

The acoustic pulse propagates along the fiber 502, and thus along the chirped Bragg-reflector 550, thereby establishing transmission of light through the Bragg-reflector 550 and effectively causing a wavelength scan of wavelengths transmitted towards the detector 556.

At the output end of the secondary fiber 502, the fiber is clamped by a clamping block 702. The clamping block 702 forms a first reflection point 710 and is arranged to give a reflection of the acoustic pulse back towards the rod 708 and the acoustic actuator 705. Furthermore, when the reflected acoustic pulse reaches the attachment of the fiber to the actuator, the pulse is again reflected, this time back towards the output end of the fiber, the attachment of the fiber to the actuator thereby forming a second reflection point 720 for the acoustic pulse.

It is preferred that acoustic pulses are sent into the fiber repeatedly, in order to provide repeated scans of transmitted wavelengths. In this embodiment, an acoustic pulse is sent into the fiber 502 at the time when the reflection in the fiber of a previous pulse reaches the attachment point between the rod and the fiber. The acoustic pulse propagating back and forth between the reflection points 710, 720 thereby achieves some additional amplitude each time the pulse reaches the reflection point at the actuator 720. Preferably, the reflection of the acoustic pulse at each reflection point 710, 720 exhibits some predefined loss. This ensures that the acoustic pulse eventually dies away in a known manner. Another advantage achieved by such a loss is that the timing requirements on the acoustic pulses from the actuator are alleviated to some extent. If an acoustic pulse from the actuator is sent into the fiber 502 slightly off schedule, this unwanted or untimely acoustic pulse will eventually die away, thereby preventing the accumulation of systematic error.

As described above, it is essential that the phase of the acoustic pulse corresponds to the chirp of the Bragg-reflector in order to give the desired result. Conveniently, the reflection of the acoustic pulse at each reflection point 710, 720 introduces a phase change of 180 degrees into the acoustic pulse. The phase of the acoustic pulse will consequently be suitable for establishing the desired transmission through the Bragg-reflector when the acoustic pulse is propagating back towards the actuator, as well. This dual-pass feature of the present invention can conveniently be utilized for correlation evaluation in order to increase resolution and/or detect and correct any possible flaws.

The dual-pass feature is also utilized for the actual interpretation of the detected light signals. In order to ascribe a certain wavelength to a certain instant, i.e., to an output signal from the detector at a certain time, a correlation procedure is utilized. A first pass of the acoustic pulse through the chirped Bragg-reflector causes transmission of a first spectrum profile. A second pass of the acoustic pulse through the chirped Bragg-reflector, now in the opposite direction, causes transmission of a second spectrum profile, which is essentially the same spectrum profile as the first spectrum profile, but in reversed timely order, since the acoustic pulse now propagates in the opposite direction through the Bragg-reflector. The acoustic pulse is then reflected back towards the Bragg-reflector a third time, causing transmission of a third spectrum profile. The third spectrum profile is essentially identical to the first spectrum profile if the first and the third pass of the acoustic pulse through the chirped Bragg-reflector are sufficiently close in time (since the light signal to be analyzed has not had time to change significantly between the first and the third pass).

Now, a correlation between the first spectrum profile and the third spectrum profile provides a first time interval, corresponding to the passage time of the acoustic pulse to complete one round trip in the fiber between the two reflection points. This first time interval should be constant, unless the length of the fiber is changed by, for example, a temperature change (i.e., thermal expansion or contraction of the fiber).

In order to correlate the second spectrum profile and the first spectrum profile, the second profile must first be mirrored. Mirroring of the second spectrum profile about a reference wavelength, and subsequent correlation between the mirrored spectrum and the first spectrum, provides a second time interval, corresponding to the time elapsed between one transmission of said reference wavelength, and the following transmission of the same reference wavelength during the following passage of the acoustic pulse through the chirped Bragg-reflector.

The relationship between the first time interval and the second time interval is constant, even if the length of the fiber changes due to, for example, temperature changes. This means that there is a unique number (equal to the relationship between the first and the second time intervals) associated with each reference wavelength. By measuring the time intervals, calculating the relationship, and comparing the relationship with a stored value in a look-up table, the corresponding real value for each reference wavelength is obtained.

The analysis of the spectrum profiles is preferably done after sampling the detector output signal into a digitally encoded form, each time interval thus corresponding to a certain number of samples.

Furthermore, by monitoring said first time interval, a change in fiber length due to, for example, temperature changes, can be detected. Consequently, the repetition rate of the acoustic pulses can be controlled to comply with the length of the fiber. Hence, resonant feeding of acoustic pulses from the actuator is possible even if the length of the fiber is changed.

By basic symmetry considerations, it is obvious that the length of the piezo device 705 must be carefully selected to suit the desired pulse length of the acoustic pulse to be sent into the fiber 502. A person having ordinary skill in the art will find the suitable length of the piezo device by simple tests and/or computer simulations.

Having described the general features of the acoustic actuator, the attachment of the fiber 502 thereto will now be described in more detail with reference to FIGS. 7–9.

Figure 7:
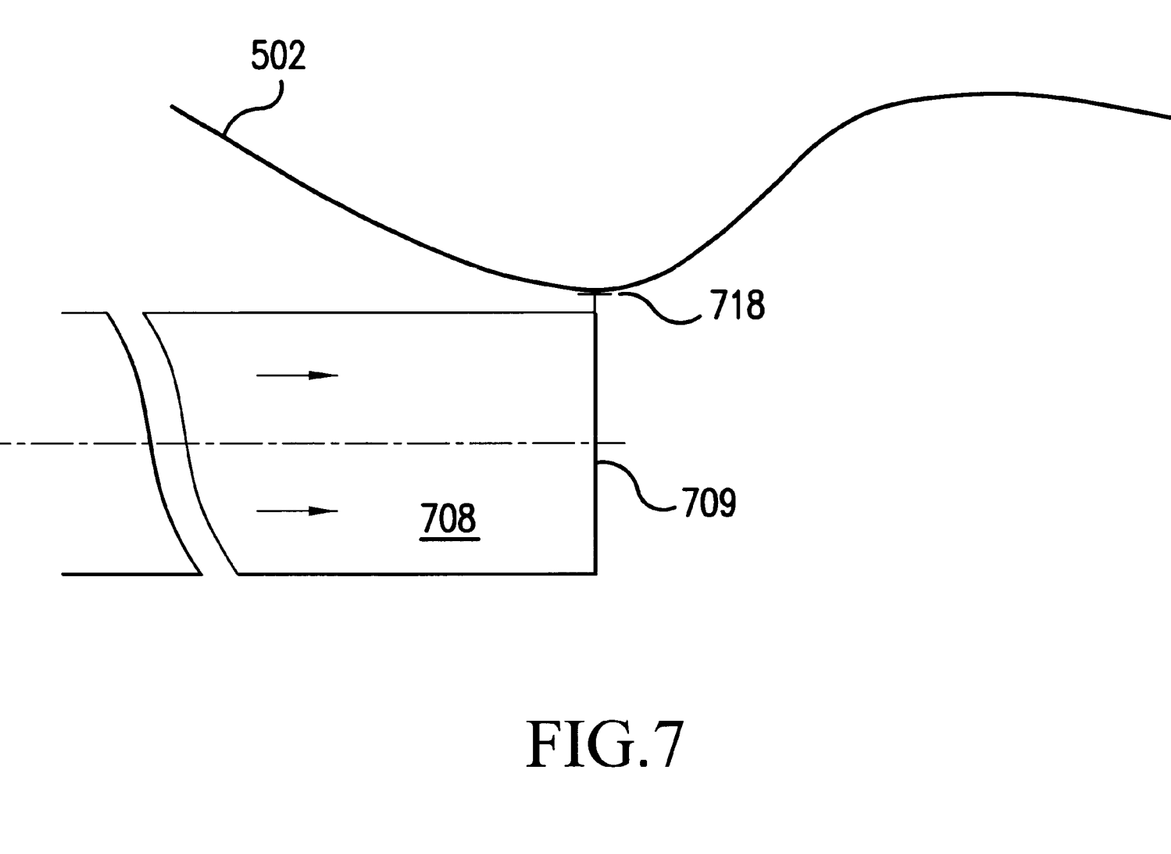
FIGS. 7–9 shows the attachment of the fiber to the acoustic actuator in greater detail.

FIG. 7 shows schematically the end 708 of the actuator rod to which the fiber 502 is attached. As illustrated in the figure, the end of the rod is provided with a shoulder 718, which the fiber 502 is to bear against.

Figure 8:
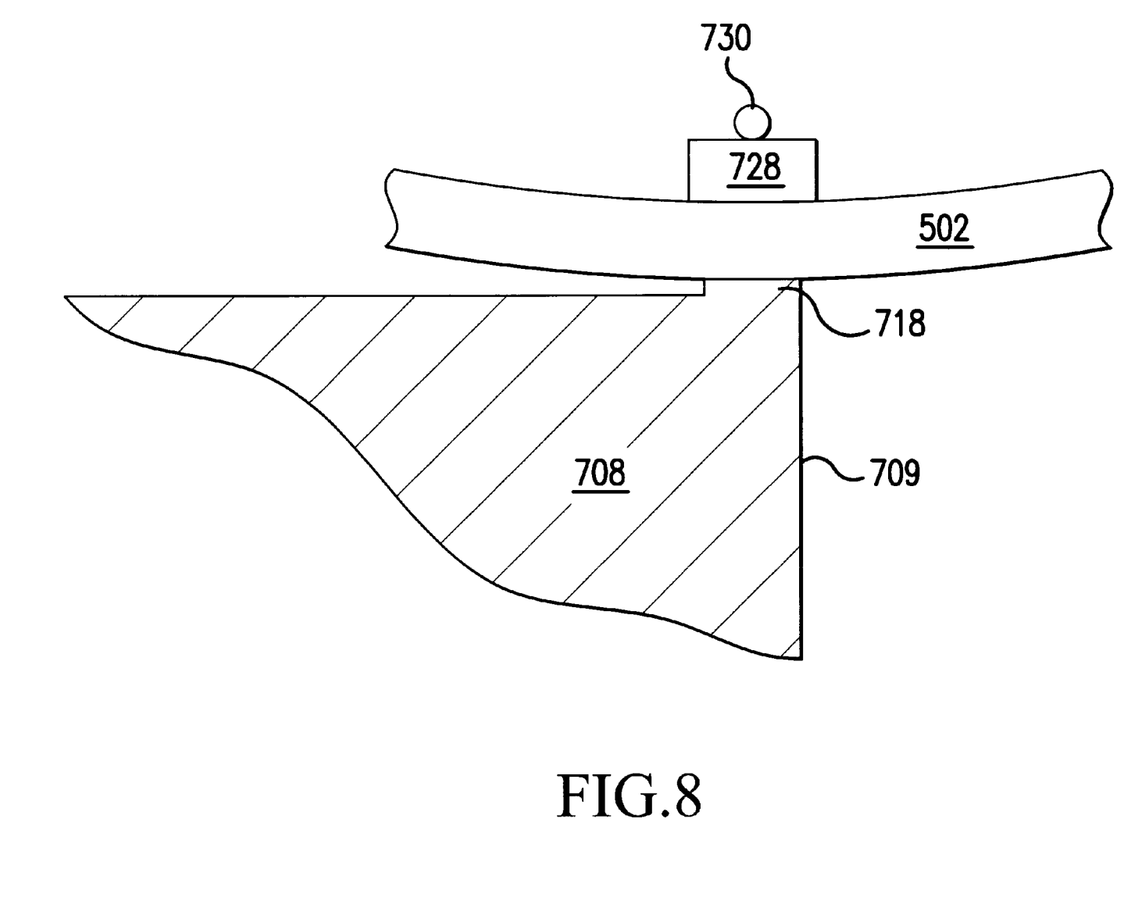

In FIG. 8, the end of the rod is shown in greater detail. The fiber 502 bears against the shoulder 718 and is fixed thereto by means of a contact block 728. The contact block 728 is tightened to the fiber 502 by means of a wire 730, in this case a tungsten wire, surrounding the entire rod 708. The purpose of the contact block 728 is to distribute the force from the wire 730, and to give a well-defined interaction length L between the fiber 502 and the actuator rod.

The placement and the length of the shoulder 718 requires some consideration. The placement of the shoulder 718 needs to be close to the end of the actuator rod which, in practice, means that the center of the shoulder should be within a fraction of the shortest wavelength (the highest frequency) building up the acoustic pulse. Such an arrangement of the shoulder minimizes distortion of the acoustic pulse when transferred from the rod to the fiber. The placement of the shoulder 718 can also be utilized to obtain a desired distortion, e.g., a low pass filtering, of the acoustic pulse when it enters the optical fiber 502.

Figure 9:
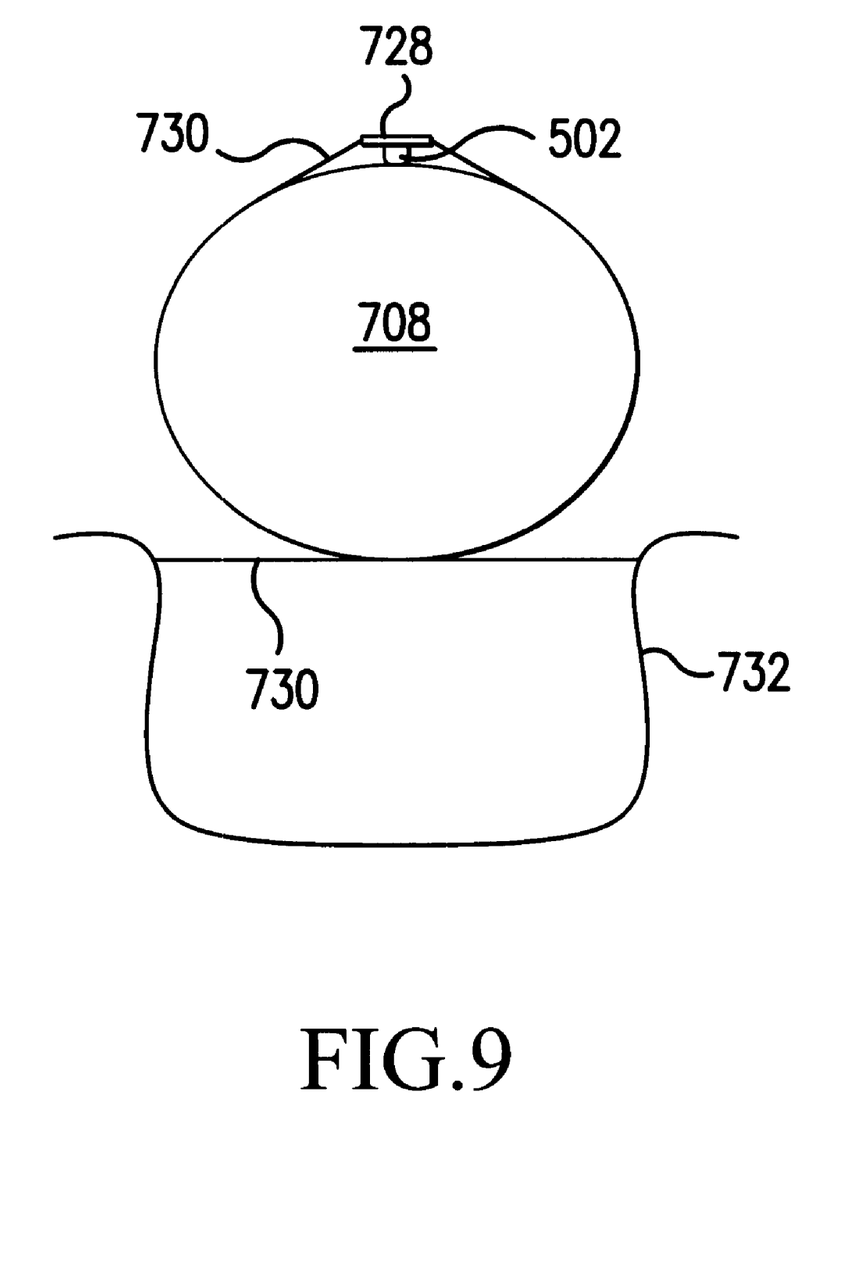

FIG. 9 is a cross-sectional view of the attachment of the fiber 502 to the actuator rod 708. The fiber 502 is clamped to the rod 708 by means of the contact block 728, and fixed into place by the wire 730. The wire 730 is wound one full turn around the rod 708, and is tightened by a spring 732, as shown. This arrangement ensures firm attachment of the fiber 502 to the actuator rod 708 in a well-defined way.

Thus, the proximity of the attachment point (i.e., the shoulder 718) to the end of the actuator rod 708 allows for reliable transfer of acoustic pulses into the fiber 502. More particularly, the closeness of the shoulder 718 to the end of the rod eliminates any influence from possible interference between a portion of the acoustic pulse propagating in one direction and a portion of the acoustic pulse propagating, after reflection, in the opposite direction.

Figure 10:
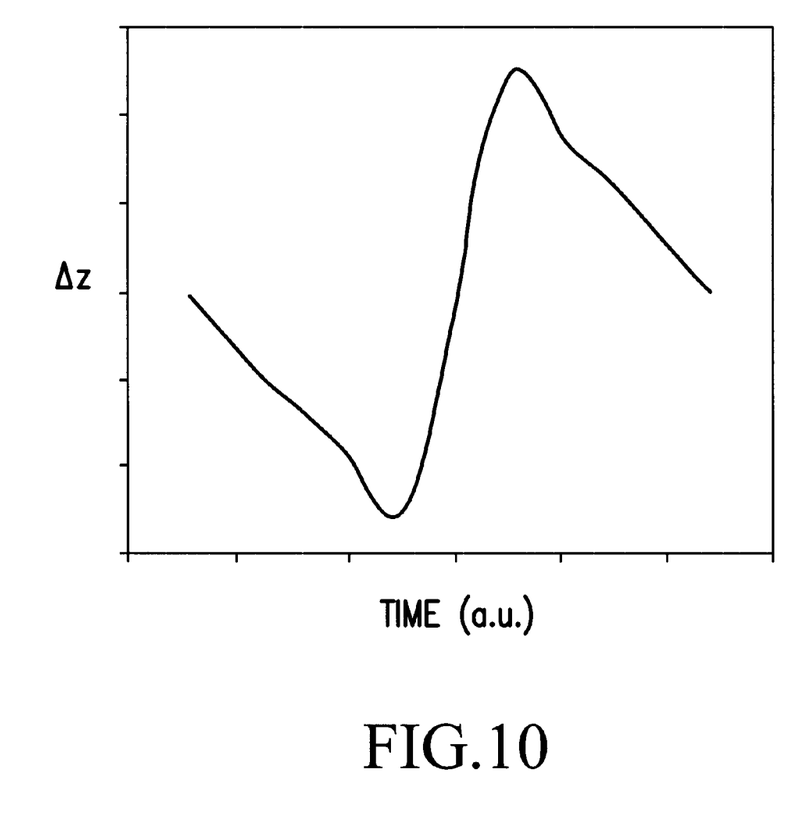
FIG. 10 shows the shape of an acoustic pulse in accordance with the present invention.
Figure 11:
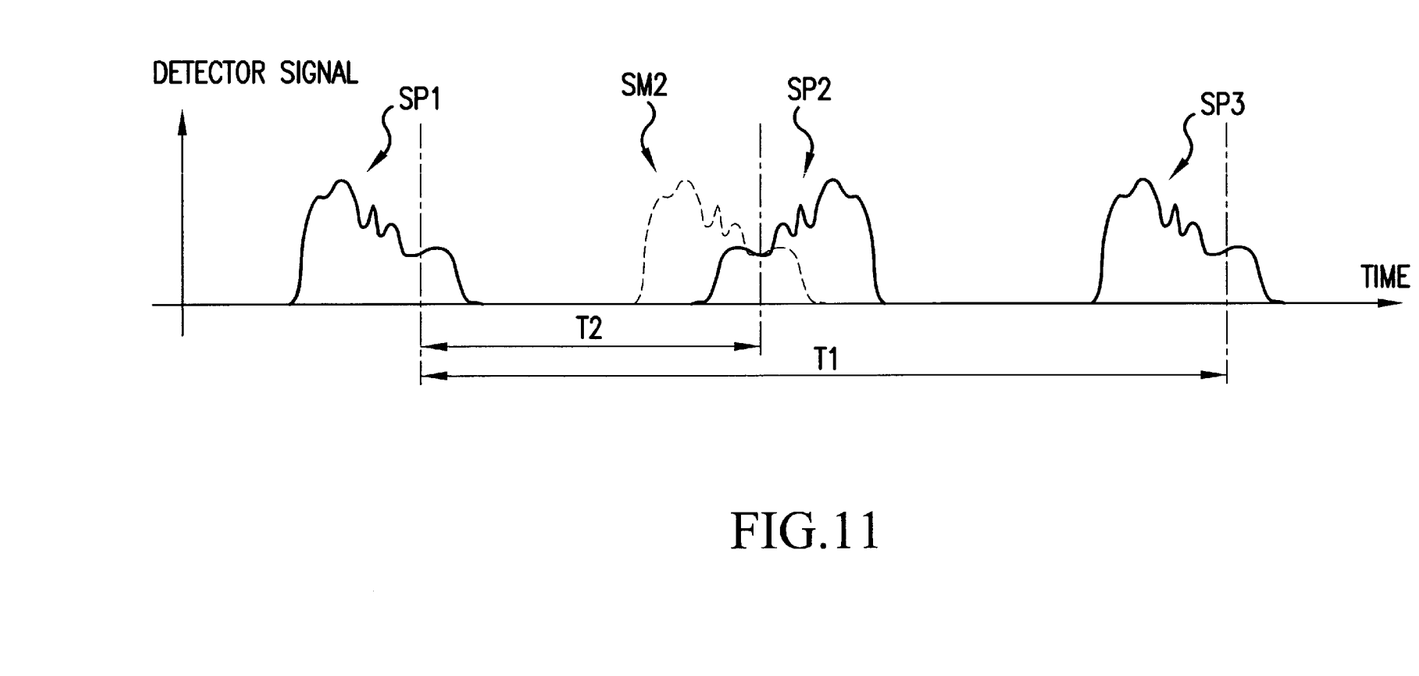
FIG. 11 shows a detector output signal and illustrates a correlation interpretation method according to the present invention.

FIG. 10 shows an example of a longitudinal acoustic pulse, illustrating its shape as it propagates in the actuator rod 708 and in the optical fiber 502 according to the present invention. In the shown example, the pulse is anti-symmetric and plotted in terms of change in length $\Delta z$. The shape shown is preferred, since such a shape gives a transmittance peak of close to 100 percent transmission of a certain wavelength.

Although the present invention has been described with reference to the drawings and by way of preferred embodiments, it is to be understood that the embodiments described can undergo several alterations and modifications without departing from the scope of the invention as claimed in the accompanying claims.

What is claimed is:

1. A method of establishing transmission of light through a light guiding structure incorporating a chirped Bragg-reflector, comprising the steps of:

directing light into an input end of said light guiding structure, and sending a longitudinal acoustic pulse into said light guiding structure for propagation along the same, the acoustic pulse being such that, for each location of said acoustic pulse in said Bragg-reflector, the reflectivity for a wavelength associated with said location in said Bragg-reflector is altered, and said acoustic pulse having a first part and a second part, said first part causing a temporary increase of the local grating period of the chirped Bragg-reflector, and said second part causing a temporary decrease of the local grating period of said Bragg-reflector.

2. The method as set forth in claim 1, wherein the propagation of the acoustic pulse along said light guiding structure causes an alteration of the local grating period of said chirped Bragg-reflector to provide, for each location of said acoustic pulse in said Bragg-reflector, transmission of a wavelength associated with said location, thereby providing a wavelength scan of transmitted wavelengths as the acoustic pulse propagates along said Bragg-reflector.

3. The method as set forth in claim 1, wherein the portion of said chirped Bragg-reflector containing the first part of said acoustic pulse has, in its unperturbed state, a longer grating period than the portion of said Bragg-reflector containing the second part of said acoustic pulse.

4. The method as set forth in claim 1, wherein the step of sending a longitudinal acoustic pulse through the light guiding structure is performed repeatedly, whereby a plurality of acoustic pulses is sent through said light guiding structure, of what plurality of acoustic pulses only one acoustic pulse is present in the chirped Bragg-reflector at any one instant.

5. The method as set forth in claim 1, further comprising the step of detecting, at an output end of the light guiding structure, the intensity of the light transmitted, the light detected at a certain instant in time corresponding to a certain wavelength, thereby allowing analysis of the power spectrum of the light directed into said light guiding structure.

6. The method as set forth in claim 5, further including the step of pre-filtering the light to be directed into the light guiding structure by means of a broadband filter, said filter passing essentially the same wavelength range as the chirped Bragg-reflector reflects.

7. The method as set forth in claim 1, wherein either one of the first and the second part of the acoustic pulse is predominant, the acoustic pulse thereby causing mainly an increase or mainly a decrease of the local grating period of the Bragg-reflector.

8. The method as set forth in claim 1, wherein said light guiding structure is the core of an optical fiber.

9. An arrangement for analyzing the power spectrum of a light signal, comprising:

a light guiding structure, having an input end and an output end;

a chirped Bragg-reflector in said light guiding structure, which chirped Bragg-reflector is provided between the input end and the output end;

an acoustic actuator connected to said light guiding structure; and a detector provided at the output end of said light guiding structure, said detector delivering a detector output signal, wherein the input end of said light guiding structure is arranged to receive the light signal to be analyzed, said acoustic actuator is operative to emit a longitudinal acoustic pulse for propagation along the light guiding structure, and said detector is operative to detect the light thus transmitted through said Bragg-reflector and to provide a detector output signal associated with the power spectrum of said light signal, said light guiding structure being clamped at a first point and a second point thereof, thereby defining a first and a second reflection point, at which reflection points the acoustic pulse is reflected to effectively provide multiple passages of the acoustic pulse through the Bragg-reflector.

10. The arrangement as set forth in claim 9, further including a broadband filter provided in the light path prior to the input end of the light guiding structure, said filter being arranged to pass only light of a desired wavelength range said light guiding structure.

11. The arrangement as set forth in claim 10, wherein the broadband filter is arrange to pass essentially the same wavelength range as the chirped Bragg-reflector reflects.

12. The arrangement as set forth in claim 9, further comprising a logic unit connected to said acoustic actuator, for supplying actuating pulses to said acoustic actuator.

13. The arrangement as set forth in claim 12, further comprising a processing unit, which is arranged to control the operating of the logic unit.

14. The arrangement as set forth in claim 12, wherein the logic unit is arranged to perform basic signal analysis of the detector output signal.

15. The arrangement as set forth in claim 14, wherein the basic signal analysis performed by the logic unit is utilized for the control of the acoustic actuator.

16. The arrangement as set forth in claim 9, wherein the acoustic actuator is connected to the light guiding structure at either one of the first and the second reflection points.

17. The arrangement as set forth in claim 9, wherein the acoustic actuator is arranged to emit a longitudinal acoustic pulse into the light guiding structure at the time when a previous acoustic pulse, after its reflection, arrives at the point where said actuator is connected to the light guiding structure.

18. A method of analyzing the power spectrum of a light signal, comprising the steps of:
    directing the light signal to be analyzed into a light guiding structure incorporating a chirped Bragg-reflector;
    sending a longitudinal acoustic pulse into said light guiding structure for propagation along the same, the acoustic pulse being such that, for each location of said acoustic pulse in said Bragg-reflector, the reflectivity for a wavelength associated with said location in said Bragg-reflector is altered;
    monitoring the light thus transmitted through said light guiding structure; and
    analyzing the monitored light, in order to obtain a power spectrum analysis of the light signal directed into the light guiding structure, said acoustic pulse having a first part and a second part, said first part causing a temporary increase of the local grating period of the Bragg-reflector, and said second part causing a temporary decrease of the local grating period of said Bragg-reflector.

19. The method as set forth in claim 18, wherein the propagation of the acoustic pulse along said light guiding structure causes an alteration of the local grating period of said chirped Bragg-reflector to provide, for each location of said acoustic pulse in said Bragg-reflector, transmission of a wavelength associated with said location, thereby providing a wavelength scan of transmitted wavelengths as the acoustic pulse propagates along said Bragg-reflector.

20. The method as set forth in claim 18 wherein the portion of said chirped Bragg-reflector containing the first part of said acoustic pulse has, in its unperturbed state, a longer grating period than the portion of said Bragg-reflector containing the second part of said acoustic pulse.

21. The method as set forth in claim 18, wherein the step of monitoring the light transmitted through the light guiding structure includes detecting said transmitted light by means of a detector, the detector providing a detector output signal associated with the power of the transmitted light signal.

22. The method as set forth in claim 18, wherein said light guiding structure is the core of an optical fiber.

23. The method as set forth in claim 21, wherein the step of sending a longitudinal acoustic pulse along the light guiding structure is performed repeatedly, whereby a plurality of acoustic pulses is sent along said light guiding structure, of which plurality of acoustic pulses only one acoustic pulse is present in the chirped Bragg-reflector at any one instant.

24. The method as set forth in claim 23, wherein each acoustic pulse is reflected back and forth between two reflection points in the light guiding structure, each successive pulse of said plurality of acoustic pulses being sent into the light guiding structure at the time when the previous acoustic pulse, after its reflection, reaches the acoustic actuator.

25. The method as set forth in claim 24, wherein th wavelength scan obtained by a passage of an acoustic pulse through the chirped Brag-reflector is utilized together with a subsequent wavelength scan for spectrum analysis of the light signal directed into the light guiding structure.

26. The method as set forth in claim 25, wherein correlation between different wavelength scans in the detector output signal is performed in order to interpret said detector output signals, to ascribe the detector output at a certain instant to a specific wavelength.

27. The method as set forth in claim 18, further including the step of
    pre-filtering the light to be directed into the light guiding structure by means of a broadband filter, said filter passing essentially the same wavelength range as the chirped Bragg-reflector reflects.

28. The method as set forth in claim 21, wherein the detector output signal is fed to a logic unit, said logic unit processing said detector output signal to provide a logic unit output signal indicative of the power spectrum of the light signal directed into the light guiding structure.

29. A method of analyzing the power spectrum of a light signal, comprising the steps of:
    directing the light signal to be analyzed into a light guiding structure incorporating a chirped Bragg-reflector;
    sending a longitudinal acoustic pulse into said light guiding structure for propagation along the same, the acoustic pulse being such that, for each location of said acoustic pulse in said Bragg-reflector, the reflectivity for a wavelength associated with said location in said Bragg-reflector is altered;
    monitoring the light thus transmitted through said light guiding structure; and
    analyzing the monitored light, in order to obtain a power spectrum analysis of the light signal directed into the light guiding structure, said acoustic pulse having a first part and a second part, said first part causing a temporary increase of the local grating period of the Bragg-reflector, and said second part causing a temporary decrease of the local grating period of said Bragg-reflector, wherein:
        the step of monitoring the light transmitted through the light guiding structure includes detecting said transmitted light by means of a detector, the detector providing a detector output signal associated with the power of the transmitted light signal;
        the step of sending a longitudinal acoustic pulse along the light guiding structure is performed repeatedly, whereby a plurality of acoustic pulses is sent along said light guiding structure, of which plurality of acoustic pulses only one acoustic pulse is present in the chirped Bragg-reflector at any one instant, and
        each acoustic pulse is reflected back and forth between two reflection points in the light guiding structure, each successive pulse of said plurality of acoustic pulses being sent into the light guiding structure at the time when the previous acoustic pulse, after its reflection, reaches the acoustic actuator.

\* \* \* \* \*